United States Patent

Wetzel

[11] 4,235,119
[45] Nov. 25, 1980

[54] TOOTHED BELT

[75] Inventor: Robert E. Wetzel, Springfield, Mo.

[73] Assignee: Dayco Corporation, Dayton, Ohio

[21] Appl. No.: 957,280

[22] Filed: Nov. 2, 1978

[51] Int. Cl.² .................. F16G 1/00; F16G 1/22; F16G 1/28
[52] U.S. Cl. .................................. 474/205; 474/263
[58] Field of Search .......... 74/231 R, 231 C, 232, 74/237; 156/138, 140, 141

[56] References Cited

U.S. PATENT DOCUMENTS

| | | | |
|---|---|---|---|
| 3,078,206 | 2/1963 | Skura | 74/231 C |
| 3,250,653 | 5/1966 | Geist et al. | 156/138 |
| 3,478,612 | 11/1969 | Wetzel | 74/232 |
| 3,535,946 | 10/1970 | Miller | 74/232 |
| 3,621,727 | 11/1971 | Cicognani | 74/231 R |
| 3,937,094 | 2/1976 | Cicognani | 74/231 C |
| 3,995,507 | 12/1976 | White et al. | 156/140 |
| 4,011,766 | 3/1977 | Waugh | 74/237 X |
| 4,041,789 | 8/1977 | Hoback | 74/231 C |

Primary Examiner—Lawrence J. Staab
Attorney, Agent, or Firm—Charles E. Bricker; Reuben Wolk

[57] ABSTRACT

A reinforced elastomeric drive belt 20 having tooth-like protuberances 21 for meshing with the teeth of a pulley is provided with reinforcing fibers 27 distributed through at least a portion of each tooth 21.

Also provided is a method for building the improved belt and an improved apparatus for building such a belt.

6 Claims, 10 Drawing Figures

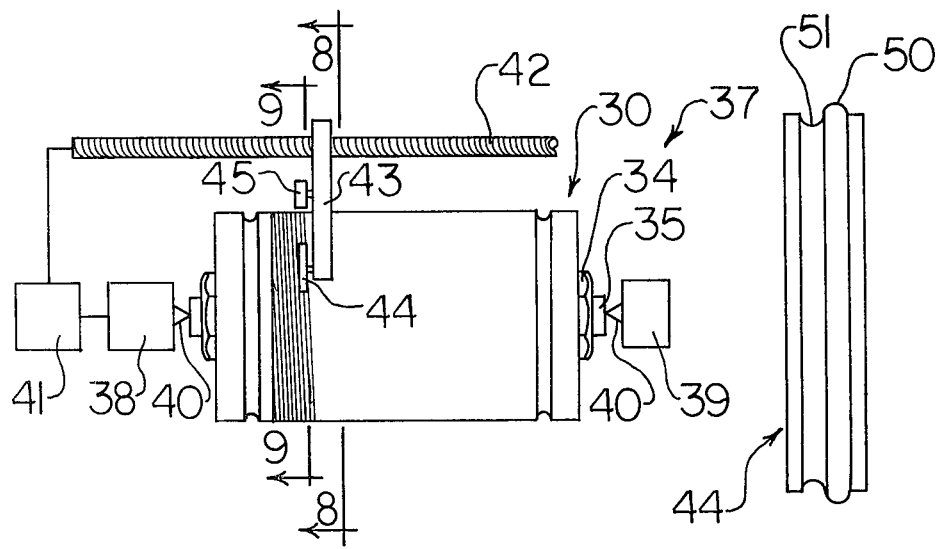
FIG. 7  FIG. 10
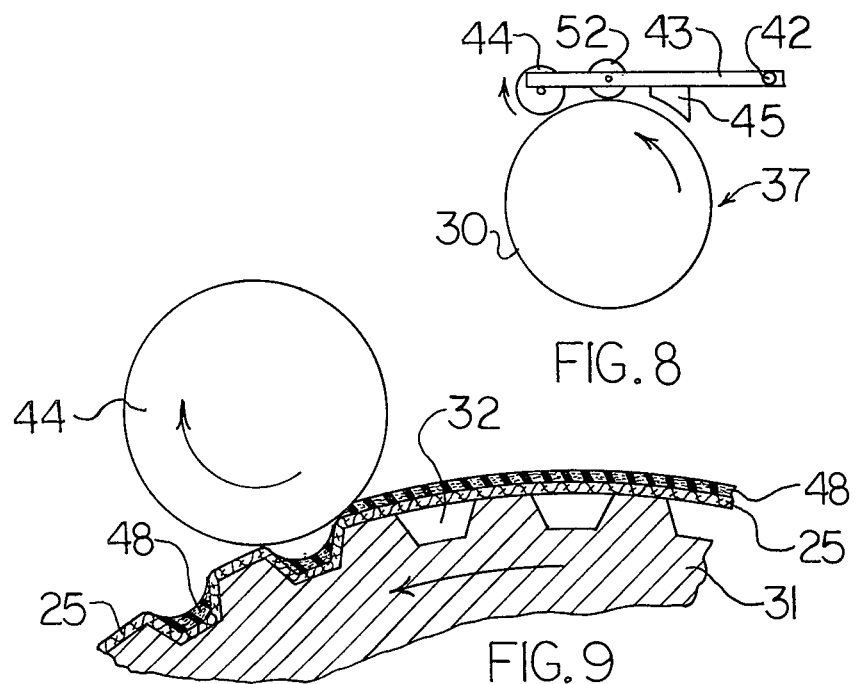
FIG. 8
FIG. 9

TOOTHED BELT

BACKGROUND OF THE INVENTION

This invention relates to endless positive drive transmission belts. In one aspect, the invention relates to an improved belt tooth construction. In another aspect, the invention relates to an improved method for making toothed belts. In a further aspect the invention relates to an apparatus for making an improved toothed belt.

Power transmission belts used with toothed pulleys are well known in the art. These belts have a plurality of alternating teeth and grooves extending generally transversely of the belt which mesh with alternating teeth and grooves of the toothed pulley or sprocket in order to perform their driving function. The most widely used of these toothed belts are so-called synchronous or positive drive belts which are manufactured from flexible resilient material such as natural or synthetic rubber. These belts are engineered and manufactured with pitch, tooth depth, width and other measurements accurate to a precise degree of extremely close tolerances being maintained. In addition, a high strength tensile stress-resisting member of essentially inextensible material is provided substantially on the dedendum line of the teeth to prevent undue stretching of the belt. This belt construction allows the flexible, resilient belt teeth to mesh without substantial change of pitch with teeth of the toothed pulleys, with the belt thereby functioning as a synchronizing belt. The operation and advantages of synchronous drive belts are fully described in Case, U.S. Pat. No. 2,507,852.

Conventionally, in the prior art, these synchronous belts have been made by one of the following methods: (a) the extruded tooth method; (b) the tooth preform method; and (c) the flow through method.

The extruded tooth method, as described by Case, U.S. Pat. No. 2,507,852 comprises the steps of lining a grooved mold with fabric, filling the grooved spaces with strips of an unvulcanized, plasticized rubber compound which forms the body of the belt teeth, helically winding a load-carrying member around the outer ends of the mold lands, applying a layer of rubber compound over the load-carrying member and curing the assembly under pressure.

The advantage of this system is that the elastomeric material used for the toothed portion of the belt can be made of high modulus material to resist deformation under load, while the back of the belt can be made of material designed for optimum flex-fatigue resistance. Belts made by this technique are generally of low quality. Contamination (and semi-cure) due in large part to the extrusion process used to form the tooth material results in low levels of adhesion between the fabric facing and the tooth material and more importantly between the tooth material and the load carrying member of the belt. Further, very little movement of rubber occurs during vulcanization and release agents applied to the extruded tooth material prevent the formation of good chemical bonds between elements even when the greatest care is taken to prevent contamination. Additionally, if the volume of the extruded tooth material is not carefully controlled the load carrying cords will be wound on the tops of the extruded tooth material instead of the mold land area. This increases the pitch length of the belts produced and makes accurate length control difficult to achieve.

The tooth preform method as disclosed by Geise et al, U.S. Pat. No. 3,250,653 and Lindner et al, U.S. Pat. No. 3,973,894, comprises the step of forming an enveloping fabric in precise confirmity with the shape of the teeth and filling in the formed hollow folds with a plastic raw mixture. This preform is placed upon the tooth core of a suitable belt building device and the remaining components are built up on the building device.

The advantage of this method is that contamination is reduced considerably because of the wiping action of the rubber during preforming. Contamination at the interface between the load carrying member and the preform still limits the performance of these belts and length control is an even greater problem than with the previous method. Very frequently a layer of rubber remains in the land area of the preform and this results in the load carrying member being wound on a larger circumference than the designer intended. Once again length control becomes very difficult.

Belts made from either of the above methods have stock interfaces directly beneath and adjacent to the load carrying member of the belt. This is the area of highest shear stress in the belt and at the same time it is also the area likely to have the poorest bond strength.

The flow-through method, as described by Skura, U.S. Pat. No. 3,078,206 comprises the steps of wrapping a jacket fabric around a grooved mold, winding a tensile member over the jacket, wrapping a layer of rubber over the tensile member, and then forcing a portion of the backing layer through the tensile member into the grooves of the mold to form the belt teeth. In this operation, the jacket fabric is stretched by the mold rubber and conforms to the contour of the grooved mold.

This method of manufacture overcomes the adhesive interface problems associated with the previous two methods because the belt backing material extends through the tensile member layer into the belt teeth. A further advantage of this system is that the grain of the rubber in the teeth is oriented to resist shear failure. The greatest problem with this method is that the elastomeric material used in this belt must be designed for the needs of the manufacturing process rather than for the finished product. This puts severe limits on the performance capability of these belts. High strength high modulus materials cannot be successfully molded through the neutral axis layer, thereby limiting the strength and modulus of the belt teeth.

The belt teeth of synchronous belts are subjected to a very high shear stress and it has been found that the greatest belt failure occurs as a result of the complete shearing of the teeth from the remaining belt structure. Many different elastomeric materials, as well as different tooth and pulley configurations, have been proposed or utilized to reduce or eliminate the amount of shear to which the belt teeth are subjected.

It has been proposed to alter the tooth construction by incorporating reinforcing means into the matrix of the relatively weaker elastomeric material. The elastomeric matrix in which the fibers are embedded serves to transmit the load from fiber to a fiber by shear. Since the length/diameter ratio of the fiber reinforcing material is large, the shear load of the matrix is low and consequently, the fiber becomes the highly loaded component of the composite structure.

When making toothed belts by the extruded tooth method or the tooth preform method, incorporation of fiber reinforcing material into the elastomeric matrix presents no real problem. The flow-through method, however, requires elastomeric compounds having relatively low compound viscosities. Incorporation of fiber reinforcing material into the elastomeric matrix increases the compound viscosity. Miller, U.S. Pat. No. 3,535,946, discloses that toothed belts having fiber reinforcement in at least a portion of the tooth can be made using the flow-through method. In practice, however, it has been found that the tensile member must be spaced apart enough to allow the fiber-filled elastomeric matrix to flow through, thereby reducing the tensile strength of the belt.

It is therefore, an object of the present invention to provide an improved toothed belt.

Another object is to provide an improved method for making toothed belts.

A further object is to provide an apparatus for making toothed belts.

These and other objects, aspects and advantages of the present invention will appear more clearly from the following specification in connection with the accompanying drawings.

SUMMARY OF THE INVENTION

In accordance with the present invention, there is provided an improved positive drive transmission belt comprising a tensile member, elastomeric teeth bonded to at least one side of the tensile member, a backing layer of elastomeric material on the tensile member, a covering for the teeth and reinforcing fibers distributed through at least a portion of each tooth.

The improved belt of this invention may be made by the following method which comprises the steps of wrapping a tooth covering fabric around a grooved mold; wrapping a layer of fiber-loaded elastomeric material around the covering fabric; forcing a portion of the fiber-loaded elastomeric material and the fabric into the grooves of the mold; winding a tensile member over the fiber-loaded elastomeric material; wrapping a layer of elastomeric material over the tensile member; and then forcing a portion of the backing layer, i.e., the layer of elastomeric material, through the windings of the tensile member to embed the tensile member and to fill in the belt teeth, as necessary.

Also provided is an improved apparatus for building toothed belts, which is described below.

BRIEF DESCRIPTION OF THE DRAWINGS

In the drawing:

FIG. 7 is a top view of a portion of a belt building apparatus having the mold assembly in FIG. 4 mounted thereon;

FIG. 8 is a cross-sectional view of the apparatus shown in FIG. 7 taken on line 8—8;

FIG. 9 is an enlarged view of a portion of the apparatus shown in FIG. 7, taken on lines 9—9; and FIG. 10 is an elevational view of the improved cord laydown wheel of this invention.

DETAILED DESCRIPTION OF THE DRAWINGS

Figure 1:
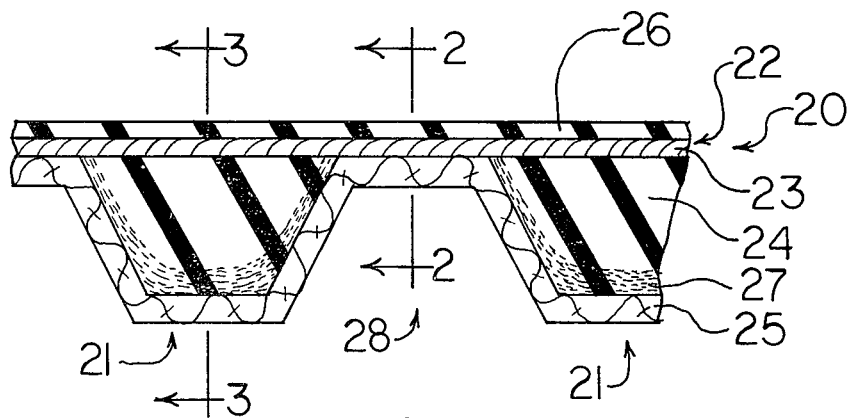
FIG. 1 is a longitudinal cross-sectional view of a synchronous belt made in accordance with this invention.
Figure 2:
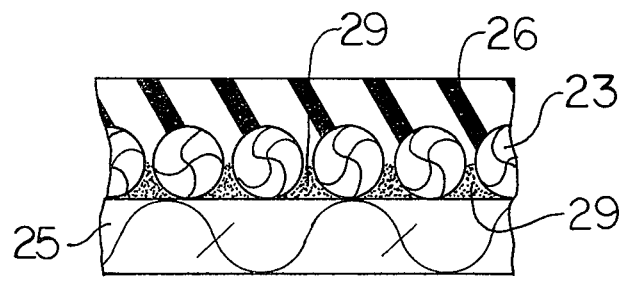
FIG. 2 is a cross-sectional view of an embodiment of this invention taken at lines 2—2 of FIG. 1.
Figure 3:
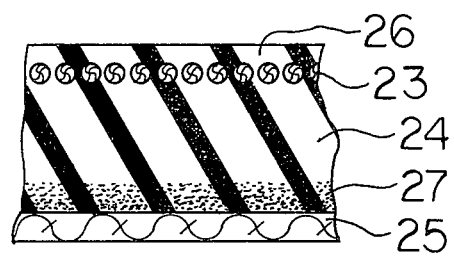
FIG. 3 is a cross-sectional view of an embodiment of this invention taken at lines 3—3 of FIG. 1.
Figure 4:
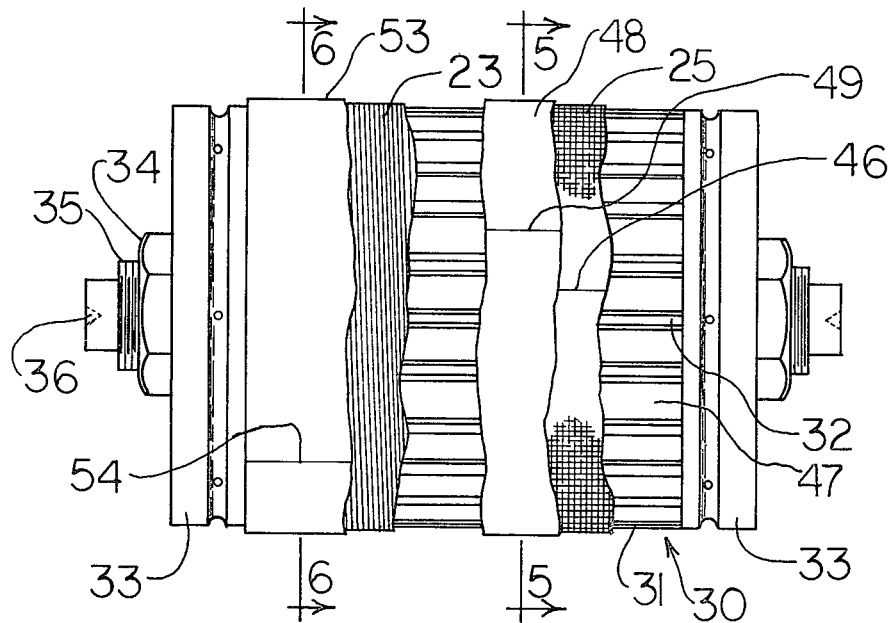
FIG. 4 is an elevational view of a belt mold with the belt parts built up thereon in areadiness for the molding operation but showing parts of the belt broken away to better illustrate the process.

Referring to FIGS. 1-3 of the drawings, the belt 20 made in accordance with the present invention comprises a plurality of spaced teeth 21 which are bonded to a load-carrying band 22 of flexible, substantially inextensible material. As shown herein the band 22 is made of a plurality of helical convolutions of cords 23. The band 22 may also be made of suitable woven fabric having its ends suitably joined, or spliced, in the event the belt is to be used for very light loads. The body 24 of the belt teeth is made of an elastomeric material, such as rubber or plastic material, and the teeth 21 are covered with a fabric jacket 25, which is united to the elastomeric body 24 and the load-carrying band 22 between the belt teeth 21. The belt 20 is generally provided with a top cover 26 of elastomeric material, which extends through the load-carrying band 22 and is united to the tooth bodies 24 and the load-carrying band 22 and also to the fabric tooth jacket 25 between the teeth 21.

The teeth 21 are reinforced with a plurality of fibers, designated generally by the reference numeral 27. The fibers 27 are preferably oriented longitudinally to the belt 20, i.e., in the direction of the endless path of the belt. The fibers 27 are substantially homogeneously interspersed through the elastomeric material, and are shown as being located in the teeth 21 in an area immediately adjoining the fabric jacket 25.

Referring particularly to FIGS. 1 and 2, it can be seen that the cord 23 is united to the fabric jacket 25 in the area of the spaces between the teeth 21, hereinafter referred to as groove 28. Due to the novel belt building method of this invention, the interface between the cord 23 and the fabric jacket 25 in the area of the groove 28 is substantially free of the fibers 27. The fibers 27 may, however, be present in at least a portion of the spaces 29 between the cords 23 and above the fabric jacket 25, as seen in FIG. 2.

The elements of the belt 20 are built up upon a mold 30 have a cylindrical body portion 31 provided with a plurality of spaced axially extending grooves 32 in its outer circumference constituting belt tooth cavities for the formation of the belt teeth 21. The body 31 of the mold 30 is provided with end plates 33, which may be clamped to the ends of the body 31 by nuts 34 threaded onto each end of a spindle 35 having centering bores 36.

Prior to building the elements of the belt 20 on the mold 30, the mold is placed on a winding machine 37, as shown in FIGS. 7 and 8, and centered between the headstock 38 and the tailstock 39 by entrance of the centering pins 40 of the machine into the centering bores 36 of the spindle 35. The mold 30 may be manually, or automatically rotated by the winding machine, which will enable the operator to apply the belt elements thereto. A plurality of belts are built up on the mold 30 for each molding operation, and each of the elements of the several belts are applied as a unit.

The winding machine 37 also comprises means 41 for rotating the mold 30, operatively connected thereto, a lead screw 42 which may be driven by the mold rotating means 41, a cord lay-down arm 43 which is operatively connected to and driven from side-to-side by the lead screw 42, a cord lay-down wheel 44, a cord supply, not shown, and a mounting frame for the whole assembly, not shown. The winding machine thus described is conventional. It is however, modified by the addition of a heating means 45, which may be positioned on the lay-down arm 43, or it may be a separate assembly also driven in side-to-side manner by the lead screw 42. The heating means 45 is discussed in greater detail below.

The method of making the belt 20 is shown in FIGS. 4-9 of the drawings. The tooth jacket 25 is made from a piece of fabric, which is wrapped circumferentially around the cylindrical mold body 31 to form the jacket 25 of the individual belts. The fabric 25 may be square woven, biased, stress-relieved or stretchable. Where a stretchable fabric is used, it preferably is stretchable in one direction only and the stretch therein is placed circumferentially of the mold. The ends of the fabric are united with a butt joint 46, as is well known in the art, preferably placed over the ridges 47 between the grooves 32 in the outer circumference of the mold 30. The fabric 25 extends across the grooves 32 and the ridges 47, and has sufficient stretch or elasticity for the portion extending over the grooves to be stretched an amount equal to the linear cross-section dimension of the sides and bottoms of the grooves. Preferably, the elongation of the fabric 25 should be at least 60% to insure that the fabric will completely conform to the shape of the grooves 32, without undue strain or rupture.

Figure 5:
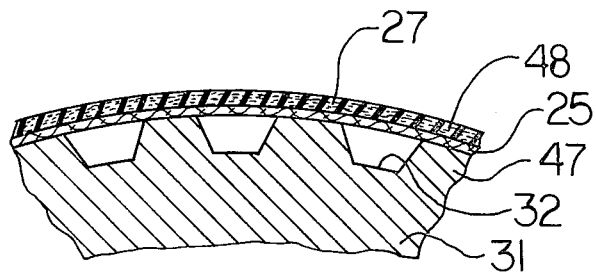
FIG. 5 is a partial cross-sectional view of the mold assembly shown in FIG. 4, taken on line 5—5.
Figure 6:
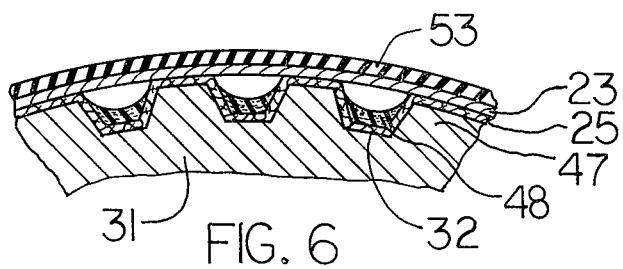
FIG. 6 is a partial cross-sectional view of the mold assembly shown in FIG. 4, taken on the line 6—6.

A layer 48 of fiber-loaded elastomeric material is wound circumferentially around the fabric layer 25 and butt jointed, as at 49. The layer 48 is made from an elastomeric material having a plurality of reinforcing fiber 27 dispersed therethrough in substantially homogeneous manner. The fibers 27 may be made of any suitable material known in the art, but are preferably made of non-metallic organic fibers, each fiber having a diameter in the approximate range of 0.001 to 0.050 inch (0.025 to 1.25 mm) and a length in the approximate range of 0.001 to as much as 1 inch (0.025 to 25 mm). The fibers 27 may be dispersed in the elastomeric material in any desired manner known in the art. The elastomer/fiber mixture is thereafter made into a sheet-like form by any suitable method known in the art, as by calendering. During such calendering the fibers 27 are oriented in a direction perpendicular to the axes of the calender rollers. The fiber/elastomer layer 48 is wound around the fabric layer 25 so that the fibers 27 are oriented with their longitudinal axes parallel to the circumference of the mold body 31, as shown in FIG. 5. The amount of fibers 27 in the fiber-loaded elastomeric material can range from about 0.5 to about 40 parts by weight per 100 parts by weight of the elastomer, preferably about 5 to 20 parts.

The load-carrying bands for the several belts are formed on the mold 30 by automatically winding over the elastomer/fiber layer 48 a plurality of turns or convolutions of the cord 23 thereby forming the load-carrying band 22 for each belt. Immediately prior thereto the belt teeth 21 are at least partially formed by heating the assembly on the mold and by applying pressure on the thus-heated assembly. FIG. 9 illustrates the formation of the teeth. The elastomer/fiber layer 48 and the fabric 25, having been previously heated by the heating means 45 are impressed into the grooves 32 by the wheel 44 as the mold is rotated under the wheel 44, thus, at least partially, forming the belt teeth 21. The completeness of formation of the belt teeth 21 in the mold, at this step in the formation of the belt, is dependent upon a number of factors such as the volume of the grooves 32, the thickness of the fiber/elastomer layer 48, the temperature to which the layers 48 and 25 have been heated, the downward pressure exerted by the wheel 44, etc.

Referring now to FIG. 10, the wheel 44 has at least one bead 50 and at least one groove 51, both of which are illustrated as being semi-circular, although the present invention is not limited thereto. In operation, the wheel 44 is mounted on the arm 43 so that the bead 50 traverses the mold 30 ahead of the groove 51. The bead 50 forces the fabric 25 and the fiber/elastomer layer 48 into the mold grooves 32 and moves the fiber/elastomer material away from the fabric 25 in the area of the ridge 47. On the next revolution of the mold 30 the cord 23, being held in precise alignment by the groove 51 in wheel 44 is wound onto the mold 30. It is also within the scope of this invention to employ two wheels in place of the single wheel 44, the first wheel having a bead 50 and the second wheel 52 having the cord alignment groove 51. It is further within the scope of this invention to employ one or more wheels each having a plurality of beads 50 and/or grooves 51.

Following the cord winding step, a layer 53 of elastomeric material is placed atop the cord 23 and butt jointed, as at 54.

Having assembled the belt materials on the mold 30, the assembly is removed from the winding machine and prepared to be placed in a suitable vulcanizer, generally a steam vulcanizer in which a portion of the elastomeric layer 53 is forced at least into the void remaining between the cords 23 and the elastomer is cured. Depending upon the thickness of the fiber/elastomer layer 48 and the volume of the grooves 32, a portion of the layer 53 may also be forced into the tooth cavities to form the remainder of the body 24 of the teeth 21.

Generally, a collapsible sleeve, either of rubber or metal, is placed around the layer 53. The assembly is then placed in the vulcanizer and cured in accordance with techniques known in the art. The steam, at an elevated pressure, is sufficiently hot to soften the elastomeric layer 53, and such pressure is sufficiently high to collapse the sleeve and force the relatively fluid elastomer through the voids in the helical group of convolutions of the load-carrying band and, as necessary, into the axially extending grooves 32 to form the belt teeth 21. The elastomer forces the stretchable fabric jacket 25 ahead of it and causes it to completely conform to the exterior shape of the tooth forming grooves 32. The elastomer 53 softens below its curing temperature, and as there is a sufficient volume of elastomer in the layer 53 to form the top cover 26 of the belt, the complete filling of the grooves 32 is assured and accurately shaped belt teeth are produced. After the grooves 32 are completely filled additional heat is supplied to the vulcanizer to cure the elastomeric portions of the belt.

After the belt has been cured, the mold is removed from the vulcanizer, the collapsible sleeve is removed from the mold and the molded belt band is stripped from the mold. Individual belts may be sliced from the molded belt band by cutting the band circumferentially.

During the tooth forming/cord winding step, the fiber/elastomer layer 48 and the fabric 25 are heated by heating means 45 to a temperature which is above ambient temperature and sufficient to soften the layer 48, but below its curing temperature. In general, these layers may be heated to a temperature in the approximate range of 100° to 212° F. (about 38°–100° C.). The surface temperature may be monitored by a radiation pyrometer or other suitable apparatus, not shown.

The heating means 45 can be any suitable heating means, such as hot air blowers, electrical resistance heaters and the like. Since the drum is in movement during the tooth forming/cord winding step, the heater temperature and the rotational speed of the mold 30 must be coordinated to provide the proper temperature at the layers 48 and 25.

Although the drawings illustrate a synchronous belt having trapezoidal-shaped teeth, the present invention is not limited thereto. It may also be used to make synchronous belts having the tooth shapes shown, for example, in U.S. Pat. Nos. 3,756,091 and 3,924,481.

The cord 23 may be any cord known in the art, such as polyester, nylon, aramid or the like. The cord 23 can have an "S" twist, a "Z" twist, or the load-carrying band 22 can comprise cords of opposite twist laid in side-by-side fashion.

The belt of this invention and its various components may be of any elastomeric material known in the art, including natural and synthetic rubber, synthetic plastic materials, and combinations thereof.

Synchronous belts constructed according to the method of this invention exhibit improved belt tooth formation as compared to belts constructed using the "flow through" method, which is well known in the art. This method also provides for selective fabric stretch in the tooth portion. It has been found that the fabric layer stretches most in the area between the teeth, with less stretch in the tooth areas, thus providing greater fabric weight in the teeth.

The method of this invention also provides improved belt length control and improved control of the location of the pitch line or neutral axis.

The following example illustrates the invention:

EXAMPLE

A series of belts were built upon a standard SU building mold. A first set was built and cured in accordance with standard building practice and comprised a nylon jacket fabric having chloroprene calendered to both sides thereof, a load-carrying band comprising a plurality of convolutions of 0.045 inch (1.143 mm) diameter glass fiber cord, and a top layer of chloroprene. These belts are designed "Standard".

A second set of belts was build according to the method of this invention and comprised the same jacket fabric, a 0.020-inch (0.51 mm) thick layer of chloroprene containing 10 phr of polyester fibers, and the same cord and top layer. These belts are designated "Invention".

The above belts were subjected to standard horsepower, life-hour tests using 3-inch (76.2 mm) pulleys, 270 pounds tension (about 122.5 Kg), driven by a 13½ hp motor. The results of these tests, expressed in hours to failure, for three belts from each set, were as follows:

|  | Hours to Failure | | |
| --- | --- | --- | --- |
| Standard | 46.6 | 41.5 | 175.3 |
| Invention | 279 | 471 | 290 |

It is clear from these results that the belt constructed according to this invention is far superior to the belts constructed using the standard method in the art.

While the preferred form of this invention has been described herein, it is to be understood that still other changes may be made without departing from the spirit of the invention and the scope of the appended claims.

I claim:

1. A positive drive power transmission belt having a plurality of alternating grooves and elastomeric teeth extending generally transversely thereof, comprising a tensile member, said teeth bonded to one side of said tensile member, a backing layer of elastomeric material bonded to said tensile member, a covering for said teeth and said grooves, and reinforcing fibers distributed through at least a portion of each of said teeth, characterized in that in the area of said grooves, said backing layer is free of said fibers, the interface between said tensile member and said covering is substantially free of said fibers, and in said teeth, said fibers are distributed at least in the area immediately adjoining said covering, wherein said tensile member comprises a plurality of convolutions of cords, and characterized in that said fibers are present in at least a portion of the spaces between said cords.

2. The belt of claim 1 wherein said covering is a stretch fabric.

3. The belt of claim 2 characterized in that said fabric is stretched to a greater degree in said groove areas than in said teeth.

4. The belt of claim 1 wherein said covering is a stress-relieved fabric.

5. The belt of claim 1 wherein said fibers are distributed throughout the elastomeric materials of said teeth.

6. The belt of claim 1 wherein said fibers are distributed in said teeth in said area immediately adjoining said covering.

* * * * *